United States Patent
Katakura et al.

(10) Patent No.: US 10,576,965 B2
(45) Date of Patent: Mar. 3, 2020

(54) STARTING CONTROL DEVICE FOR VEHICLE AND STARTING CONTROL METHOD

(71) Applicant: JATCO Ltd, Fuji-shi, Shizuoka (JP)

(72) Inventors: Shusaku Katakura, Fujisawa (JP); Yutaka Shimizu, Atsugi (JP); Tomoyuki Koike, Kanagawa (JP); Yukiyoshi Inuta, Kanagawa (JP); Youko Yoshioka, Kanagawa (JP)

(73) Assignee: JATCO LTD, Fuji-Shi (JP)

( * ) Notice: Subject to any disclaimer, the term of this patent is extended or adjusted under 35 U.S.C. 154(b) by 165 days.

(21) Appl. No.: 15/561,480

(22) PCT Filed: Mar. 9, 2016

(86) PCT No.: PCT/JP2016/057418
§ 371 (c)(1),
(2) Date: Sep. 25, 2017

(87) PCT Pub. No.: WO2016/152535
PCT Pub. Date: Sep. 29, 2016

(65) Prior Publication Data
US 2018/0105162 A1 Apr. 19, 2018

(30) Foreign Application Priority Data
Mar. 26, 2015 (JP) .................... 2015-065277

(51) Int. Cl.
*B60W 20/40* (2016.01)
*B60K 6/543* (2007.10)
(Continued)

(52) U.S. Cl.
CPC ............ *B60W 20/40* (2013.01); *B60K 6/387* (2013.01); *B60K 6/48* (2013.01); *B60K 6/543* (2013.01);
(Continued)

(58) Field of Classification Search
CPC .......... B60K 6/48; B60K 6/387; B60K 6/543; B60L 50/16; B60W 10/02; B60W 10/06;
(Continued)

(56) References Cited

U.S. PATENT DOCUMENTS

2002/0050259 A1* 5/2002 Kojima ................. B60K 6/365
123/179.3
2004/0029677 A1* 2/2004 Mori ...................... B60K 6/485
477/3
(Continued)

FOREIGN PATENT DOCUMENTS

| JP | 2000-356148 A | 12/2000 |
| JP | 2004-084679 A | 3/2004 |
| JP | 2012-097813 A | 5/2012 |

*Primary Examiner* — Atul Trivedi
(74) *Attorney, Agent, or Firm* — Foley & Lardner LLP

(57) ABSTRACT

A vehicle is provided with a mechanical oil pump (O/P) that is driven by a motor/generator (MG), an electric oil pump (M/O/P) that is driven by a sub-motor (S/M) and a second clutch (CL2) that transmits the drive force of the motor/generator (MG) to left and right drive wheels (LT, RT). When an accelerator pedal is depressed while a brake pedal is still depressed, an integrated controller (10) drives the electric oil pump (M/O/P) before the brake pedal is released, and oil pressure supplied to the second clutch (CL2) is increased.

5 Claims, 8 Drawing Sheets

(51) Int. Cl.

| | | |
|---|---|---|
| *F02D 29/04* | (2006.01) | |
| *B60W 10/06* | (2006.01) | |
| *B60W 10/02* | (2006.01) | |
| *B60W 10/30* | (2006.01) | |
| *B60W 20/00* | (2016.01) | |
| *B60W 10/08* | (2006.01) | |
| *B60W 20/19* | (2016.01) | |
| *B60K 6/48* | (2007.10) | |
| *F16H 61/00* | (2006.01) | |
| *B60L 50/16* | (2019.01) | |
| *B60K 6/387* | (2007.10) | |
| *F16D 48/02* | (2006.01) | |
| *F16H 59/18* | (2006.01) | |
| *F16H 59/54* | (2006.01) | |
| *F16D 25/00* | (2006.01) | |

(52) U.S. Cl.
CPC ............ *B60L 50/16* (2019.02); *B60W 10/02* (2013.01); *B60W 10/06* (2013.01); *B60W 10/08* (2013.01); *B60W 10/30* (2013.01); *B60W 20/00* (2013.01); *B60W 20/19* (2016.01); *F02D 29/04* (2013.01); *F16D 48/02* (2013.01); *F16H 61/0031* (2013.01); *B60W 2540/10* (2013.01); *B60W 2540/12* (2013.01); *B60W 2710/021* (2013.01); *B60Y 2200/92* (2013.01); *B60Y 2400/72* (2013.01); *F16D 25/00* (2013.01); *F16H 59/18* (2013.01); *F16H 59/54* (2013.01); *F16H 2312/14* (2013.01); *Y10S 903/914* (2013.01); *Y10S 903/918* (2013.01)

(58) Field of Classification Search
CPC ...... B60W 10/08; B60W 10/30; B60W 20/00; B60W 20/19; B60W 20/40; B60W 2540/10; B60W 2540/12; B60W 2710/021; F16H 59/18; F16H 59/54; F16H 2312/14; F16H 61/0031; F02D 29/04; Y10S 903/914; Y10S 903/918; F16D 48/02; F16D 25/00; B60Y 2400/72; B60Y 2200/92
USPC .......................................................... 701/22
See application file for complete search history.

(56) References Cited

U.S. PATENT DOCUMENTS

| | | | |
|---|---|---|---|
| 2004/0038774 A1 | 2/2004 | Kuroda et al. | |
| 2007/0078040 A1* | 4/2007 | Nobumoto | B60W 10/06 477/70 |
| 2010/0174459 A1* | 7/2010 | Gibson | B60W 10/06 701/54 |
| 2010/0174460 A1* | 7/2010 | Gibson | B60W 10/026 701/54 |
| 2011/0053735 A1* | 3/2011 | Lewis | F02N 11/0803 477/99 |
| 2012/0103709 A1 | 5/2012 | Mochiyama et al. | |
| 2012/0141297 A1 | 6/2012 | Jeong et al. | |
| 2013/0072348 A1* | 3/2013 | Lochocki, Jr. | B60W 10/06 477/54 |
| 2013/0199496 A1* | 8/2013 | Gibson | F02D 41/042 123/403 |
| 2013/0291830 A1* | 11/2013 | Doering | F02D 41/023 123/350 |
| 2013/0296121 A1* | 11/2013 | Gibson | F02D 41/022 477/5 |
| 2013/0297122 A1* | 11/2013 | Gibson | B60W 20/40 701/22 |
| 2013/0297191 A1* | 11/2013 | Gibson | F02N 11/0855 701/112 |
| 2014/0121060 A1* | 5/2014 | Gibson | B60W 10/06 477/181 |
| 2014/0121951 A1* | 5/2014 | Bidner | F02D 29/02 701/112 |
| 2014/0336907 A1* | 11/2014 | Mori | F02N 11/084 701/112 |
| 2014/0336908 A1* | 11/2014 | Mori | F02N 11/0822 701/112 |
| 2015/0011360 A1* | 1/2015 | Sano | F02D 29/02 477/203 |
| 2015/0025724 A1* | 1/2015 | Yamazaki | B60W 10/06 701/22 |
| 2015/0025739 A1 | 1/2015 | Wakairo et al. | |
| 2015/0046070 A1* | 2/2015 | Awadi | F02D 17/04 701/112 |
| 2016/0059846 A1* | 3/2016 | Wang | B60W 20/40 477/5 |
| 2016/0101769 A1* | 4/2016 | Gibson | B60W 20/00 477/5 |
| 2018/0119800 A1* | 5/2018 | Shimizu | B60K 6/48 |
| 2018/0252315 A1* | 9/2018 | Rippelmeyer | F16H 61/66272 |

* cited by examiner

10,576,965 B2

STARTING CONTROL DEVICE FOR VEHICLE AND STARTING CONTROL METHOD

TECHNICAL FIELD

The present invention relates to a starting control device for a vehicle in which a first oil pump that is driven by a traveling drive source and a second oil pump that is driven by an electric motor are provided.

BACKGROUND TECHNOLOGY

A related art vehicle has been known. As to the related art vehicle, a first oil pump that is driven by a traveling drive source and a second oil pump that is driven by an electric motor are provided, and when discharge pressure from the first oil pump is insufficient caused by a vehicle stop, the second oil pump is driven to suppress lowing of oil pressure (for example, see a patent document 1).

It is preferable that the traveling drive source and the electric motor are stopped to improve fuel economy in a state in which a brake pedal has been depressed. However, if both of the traveling drive source and the electric motor are sopped (a non-driven state), the first and the second oil pumps are stopped, and hydraulic fluid inside a hydraulic circuit is lowered caused by leaking. In general, it is considered that by driving either of the first oil pump or the second oil pump with the release of the brake pedal as a trigger, the lowering of responsiveness to starting request by the depression of an accelerator pedal is suppressed.

However, when the vehicle starts in a case where, when the vehicle runs over a level difference and at the time of a vehicle start on a climbing load, the accelerator pedal is depressed while the brake pedal is still depressed, following which the brake pedal is released, if the oil pump is driven with the release of the brake pedal as a trigger, it is difficult to sufficiently secure transmission responsiveness of drive force in a start clutch, and a problem arises that starting performance extremely deteriorates.

An object of the present invention is to provide a starting control device for a vehicle which is capable of securing starting performance in a case where an accelerator pedal is depressed while a brake pedal is still depressed, following which the brake pedal is released, and the starting of the vehicle is performed.

PRIOR ART REFERENCE

Patent Document

Patent Document 1: Japanese Patent Application Publication 2012-097813

SUMMARY OF THE INVENTION

A starting control device for a vehicle of the present invention includes a first oil pump, a second oil pump, a starting clutch and a starting controller.

The first oil pump is configured to perform hydraulic supply by being driven by a traveling drive source which becomes a non-driven state during the stopping of the vehicle while a brake pedal is depressed.

The second oil pump is configured to perform the hydraulic supply by being driven by an electric motor which becomes a non-driven state during the stopping of the vehicle while the brake pedal is depressed, the second oil pump which is provided separately from the traveling drive source.

The starting clutch is configured to transmit the drive force of the traveling drive source to drive wheels at the time of the starting of the vehicle, the starting clutch which is disposed between the traveling drive source and the drive wheels.

The starting controller is configured to increase oil pressure supplied to the starting clutch by the discharge pressure of the second oil pump by driving the second oil pump before the brake pedal is released, when an accelerator pedal is depressed while the brake pedal is still depressed during the stopping of the vehicle.

In the starting control device for the vehicle of the present invention, when the accelerator pedal is depressed while the brake pedal is still depressed during the stopping of the vehicle, before the brake pedal is released, the second oil pump is driven, and the oil pressure supplied to the starting clutch by the discharge pressure of the second oil pump is increased.

With this, during the stopping of the vehicle while the brake pedal is depressed, the oil pressure supplied to the starting clutch can be increased in advance, and it is possible to transmit the drive force of the traveling drive source to the drive wheels at the time when the brake pedal is released. With this, even in a case where the accelerator pedal is depressed while the brake pedal is still depressed during the stopping of the vehicle, following which the brake pedal is released and the starting of the vehicle is performed, the lowing of the transmission responsiveness of the drive force in the starting clutch is suppressed, and the starting performance can be secured.

In addition, as compared with the first oil pump that is driven by the traveling drive source, the second oil pump that is driven by the electric motor is capable of shortening a time lag from the receiving of a drive command to the starting of the hydraulic supply. With this, it is possible to raise the discharge pressure of the second oil pump in a short time, and even if the brake pedal is released immediately after the accelerator pedal is depressed, it is possible to increase the oil pressure supplied to the starting clutch by the second oil pump discharge pressure.

Moreover, since the oil pressure supplied to the starting clutch is increased by the second oil pump discharge pressure, it is not necessary to drive the traveling drive source. With this, fuel consumption decreases, and the deterioration of fuel economy can be suppressed.

MODE FOR IMPLEMENTING THE INVENTION

Figure 1:
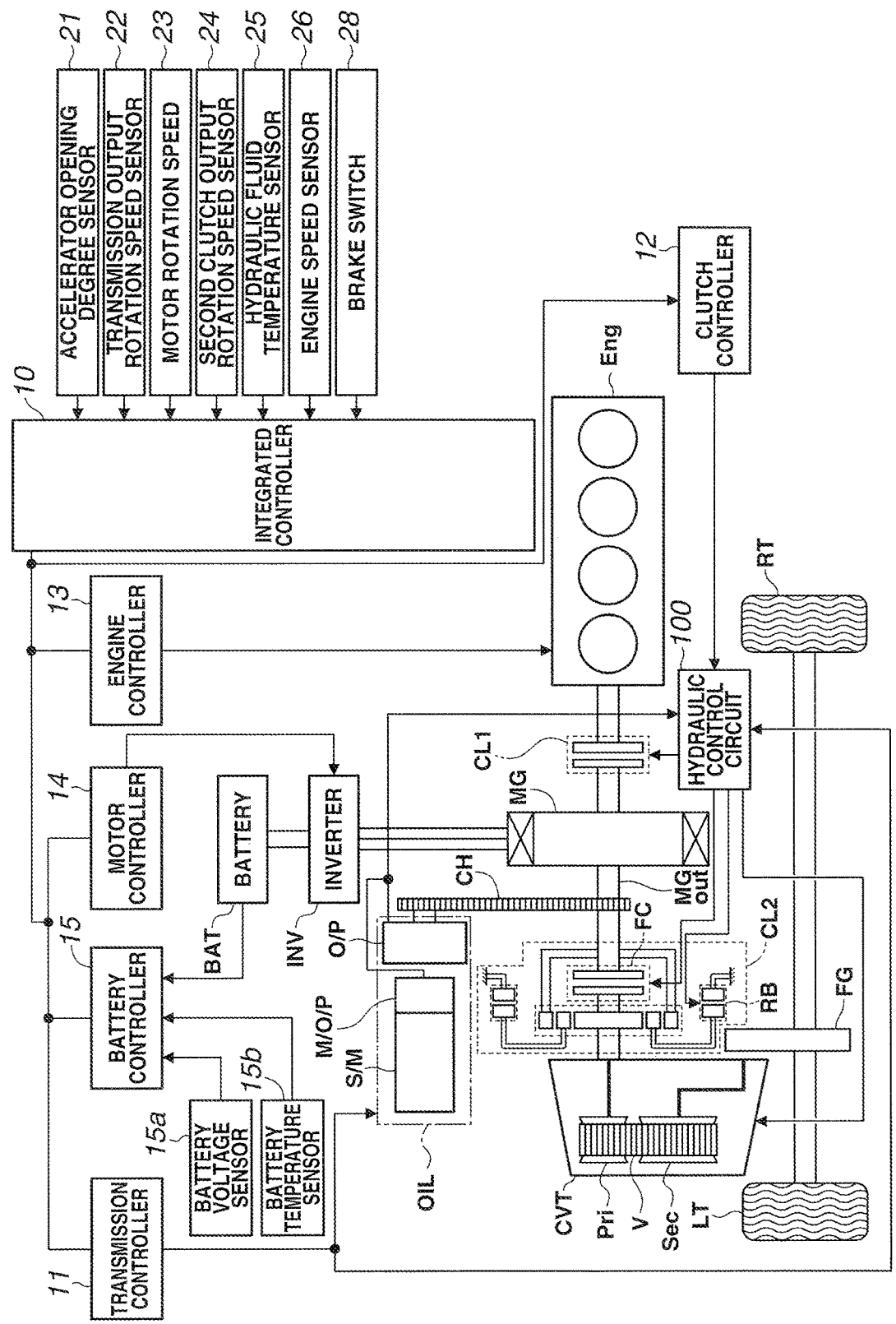
FIG. 1 is the entire schematic system diagram showing a hybrid vehicle in which a control device of an embodiment has been applied.

In the following, a mode for implementing a starting control device for a vehicle of the present invention will be explained based on an embodiment shown in the drawings.

EMBODIMENT

First, the configuration of the starting control device for the vehicle of the embodiment will be explained by dividing it into "entire system configuration of hybrid vehicle", "detail configuration of hydraulic control circuit" and "control processing configuration at time of starting of vehicle".

[Entire System Configuration of Hybrid Vehicle]

FIG. 1 is the entire schematic system diagram showing a hybrid vehicle (one example of vehicles) in which a control device of an embodiment has been applied. In the following, based on FIG. 1, the entire system configuration of the hybrid vehicle of the embodiment will be explained.

The starting control device for the vehicle of the embodiment has been applied to the hybrid vehicle shown in FIG. 1. The drive system of this hybrid vehicle is provided with an engine Eng, a first clutch CL1, a motor/generator MG (motor for traveling), a second clutch CL2 (starting clutch), a continuously variable transmission CVT, a final gear FG, a left drive wheel LT and a right drive wheel RT.

The engine Eng is a traveling drive source, and has, for example, an engine structure which is capable of performing lean combustion. This engine Eng is controlled so that engine torque matches a command value by the control of an intake air amount by a throttle actuator, a fuel injection amount by an injector and ignition timing by an ignition plug. In addition, the first clutch CL1 is engaged, and the engine Eng is started by motor torque from the motor/generator MG.

The first clutch CL1 is interposed at the position between the engine Eng and the motor/generator MG. As the first clutch CL1, for example, a dry clutch which is always disengaged (normal open) by a biasing force by a diaphragm spring is used, and it performs complete engagement/half-engagement/disengagement between the engine Eng and the motor/generator MG. If the first clutch CL1 is in a completely engaged state, the motor torque and the engine torque are transmitted to the second clutch CL2. If the first clutch CL1 is in a disengaged state, only the motor torque is transmitted to the second clutch CL2. The control of the complete engagement/half-engagement/disengagement is performed by stroke control to a hydraulic actuator.

The motor/generator MG has an AC synchronous motor structure which becomes the traveling drive source, and performs driving torque control and rotation speed control at the time of the starting and the traveling of the vehicle. In addition, the motor/generator MG performs recovery of vehicle kinetic energy to a battery BAT which is generated by regeneration brake control at the time of the braking and the deceleration of the vehicle. Moreover, it is used as an engine start motor.

The second clutch CL2 is a friction engagement element interposed between the motor/generator MG and the left and right drive wheels LT and RT, and is a starting clutch for transmitting the drive force of the traveling drive source (engine Eng and/or the motor/generator MG) to the left and right drive wheels LT and RT by being engaged at the time of the start of the vehicle.

This second clutch CL2 is formed of a wet multiple disc friction clutch operated by oil pressure, and by a second clutch oil pressure, complete engagement/slip-engagement/disengagement is controlled by the second clutch oil pressure. The second clutch CL2 of the embodiment is used as a forward clutch FC and a reverse brake RB provided at a forward/reverse traveling switch mechanism of the continuously variable transmission CVT by a planetary gear. That is, at the time of forward traveling, the forward clutch FC is used as the second clutch CL2, and at the time of reverse traveling, the reverse brake RB is used as the second clutch CL2.

The continuously variable transmission CVT is a belt type continuously variable transmission having a primary pulley Pri, a secondary pulley Sec and a pulley belt V stretched between the primary pulley Pri and the secondary pulley Sec. The pulley width of each of the primary pulley Pri and the secondary pulley Sec is changed while holding the pulley belt V by supplying oil pressure to each of them, and the diameter of the surface of each of them, on which the pulley belt V is held, is changed, and a gear ratio (pulley ratio) is freely controlled.

Moreover, an input gear of a mechanical oil pump O/P (first oil pump) is connected to a motor output shaft MGout of the motor/generator MG through a chain CH. This mechanical oil pump O/P is an oil pump to perform hydraulic supply by being driven by the rotation drive force of the motor/generator MG, and for example, a gear pump and a vane pump are used for it. In addition, the mechanical oil pump O/P is formed so as to be able to discharge hydraulic fluid regardless of the rotation direction of the motor/generator MG.

Furthermore, an electric oil pump M/O/P (second oil pump) is provided which performs the hydraulic supply by being driven by the rotation drive force of a sub-motor S/M (electric motor) which is disposed separately from the motor/generator MG.

This electric oil pump M/O/P has a three-phase AC motor structure, and is formed so as to be able to control the discharge flow rate of the hydraulic fluid by the rotation speed control.

These mechanical oil pump O/P and electric oil pump M/O/P become a hydraulic supply source OIL which generates hydraulic fluid pressure (control pressure) supplied to the first and the second clutches CL1 and CL2 and the continuously variable transmission CVT. In this hydraulic supply source OIL, when the discharge flow rate from the mechanical oil pump O/P is sufficient, the sub-motor S/M is stopped, and the electric oil pump M/O/P is stopped. In addition, when the discharge flow rate from the mechanical oil pump O/P decreases, the electric oil pump M/O/P is driven by driving the sub-motor S/M, and the hydraulic fluid is also discharged from the electric oil pump M/O/P.

As to the hybrid vehicle, a one-motor-two-clutch driving system is configured of the first clutch CL1, the motor/generator MG and the second clutch CL2, and as a main driving aspect by this driving system, the hybrid vehicle has "EV mode" and "HEV mode".

The "EV mode" is an electric vehicle mode in which the first clutch CL1 is disengaged and the second clutch CL2 is engaged, and only the motor/generator MG is used as the traveling drive source.

The "HEV mode" is a hybrid vehicle mode in which the first and the second clutches CL1 and CL2 are engaged, and the engine Eng and the motor/generator MG are used as the traveling drive source.

As shown in FIG. 1, the control system of the hybrid vehicle of the embodiment is provided with an inverter INV, the battery BAT, an integrated controller 10, a transmission controller 11, a clutch controller 12, an engine controller 13, a motor controller 14 and an a battery controller 15.

The inverter INV performs AC/DC conversion, and generates the driving current of the motor/generator MG. In addition, by inverting the phase of the driving current to be generated, the output rotation of the motor/generator MG is reversed.

The battery BAT is a secondary battery that is chargeable, and performs power supply to the motor/generator MG, and the battery BAT is charged with electric power regenerated by the motor/generator MG.

The integrated controller 10 calculates a target driving torque according to a requested driving force of a driver from a battery condition (here, it is inputted from the battery controller 15), an accelerator opening degree (here, it is detected by an accelerator opening degree sensor 21) and a vehicle speed (here, it is a value synchronized with a transmission output rotation speed, and is detected by a transmission output rotation speed sensor 22). After that, based on that result, it calculates a command value to each actuator (the motor/generator MG, the engine Eng, the first clutch CL1, the second clutch CL2 and the continuously variable transmission CVT), and it is sent to each of the controllers 11 to 15.

In addition, the integrated controller 10 is a starting controller to perform the driving control of the electric oil pump M/O/P and the control of the traveling drive source (engine Eng, motor/generator MG), at the time of the starting of the vehicle when an accelerator pedal is depressed while a brake pedal is still depressed, following which the brake pedal is released.

The transmission controller 11 performs transmission control so as to achieve a transmission command from the integrated controller 10. This transmission control is performed by controlling oil pressure supplied to each of the primary pulley Pri and the secondary pulley Sec of the continuously variable transmission CVT using a line pressure PL as original pressure which is supplied through a hydraulic control circuit 100.

A surplus pressure generated when the oil pressure supplied to the primary pulley Pri and the oil pressure supplied to the secondary pulley Sec are generated from the line pressure PL is used for cooling and lubricating the first clutch CL1 and the second clutch CL2.

The clutch controller 12 inputs a second clutch input rotation speed (it is detected by a motor rotation speed sensor 23), a second clutch output rotation speed (it is detected by a second clutch output rotation speed sensor 24) and a clutch oil temperature (it is detected by a hydraulic fluid temperature sensor 25). In addition, this clutch controller 12 performs first clutch control and second clutch control so as to achieve a first clutch control command and a second clutch control command from the integrated controller 10 respectively. The first clutch control is performed by controlling the oil pressure supplied to the first clutch CL1 using the line pressure PL as original pressure supplied through the hydraulic pressure control circuit 100. In addition, the second clutch control is performed by controlling the oil pressure supplied to the second clutch CL2 using the line pressure PL as original pressure supplied through the hydraulic pressure control circuit 100.

A surplus pressure generated when the oil pressure supplied to the first clutch CL1 and the oil pressure supplied to the second clutch CL2 are generated from the line pressure PL is used for cooling and lubricating the first clutch CL1 and the second clutch CL2.

Here, a circuit for the supply of the control oil pressure using the line pressure PL as original pressure to the primary pulley Pri and the secondary pulley Sec of the continuously variable transmission CVT and the second clutch CL2 is called as "hydraulic system Sup for transmission mechanism". In addition, a circuit for the cooling and the lubrication of the second clutch CL2 is called as "cooling/lubricating system Lub of transmission mechanism" (see FIG. 2).

The engine controller 13 inputs an engine speed (it is detected by an engine speed sensor 26), and performs the torque control of the engine Eng so as to achieve an engine torque command value corresponding to a target engine torque from the integrated controller 10.

The motor controller 14 inputs the rotation speed of the motor (it is detected by the motor rotation speed sensor 23), and performs the control of the motor/generator MG so as to achieve a motor torque command value and a motor rotation speed command value corresponding to the target motor torque from the integrated controller 10.

The battery controller 15 manages the charging state of the battery BAT, and transmits its information to the integrated controller 10. The charging state of the battery BAT is calculated based on a power supply voltage detected by a battery voltage sensor 15a and on a battery temperature detected by a battery temperature sensor 15b.

[Detail Configuration of Hydraulic Control Circuit]

Figure 2:
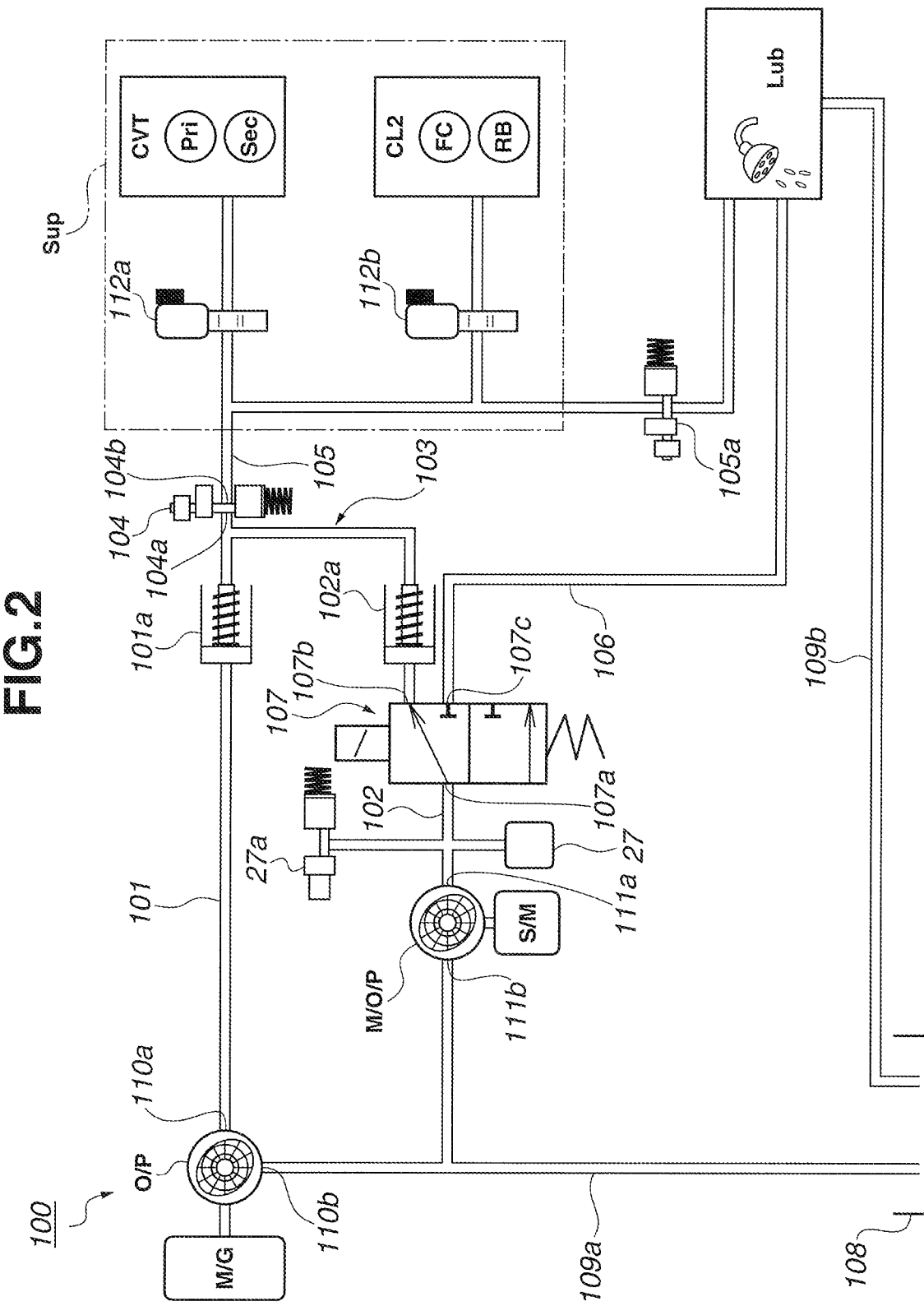
FIG. 2 is a hydraulic circuit diagram showing a hydraulic control circuit provided in the hybrid vehicle in the embodiment.

FIG. 2 is a hydraulic circuit diagram showing a hydraulic control circuit provided in the hybrid vehicle of the embodiment. In the following, based on FIG. 2, the detail configuration of the hydraulic control circuit of the embodiment will be explained.

The hydraulic control circuit 100 regulates the discharge pressure of the hydraulic supply source OIL consisting of the mechanical oil pump O/P and the electric oil pump M/O/P at the line pressure PL, and supplies it to the transmission mechanism hydraulic system Sup. In addition, in this hydraulic control circuit 100, a surplus pressure generated when the oil pressure is supplied to the transmission mechanism hydraulic system Sup is supplied to the cooling/lubricating system Lub of the transmission mechanism. Moreover, in this hydraulic control circuit 100, by switching a switching valve 107, the hydraulic fluid discharged from the electric oil pump M/O/P is directly supplied to the cooling/lubricating system Lub of the transmission mechanism.

That is, as shown in FIG. 2, the hydraulic control circuit 100 of the embodiment has the mechanical oil pump O/P, the electric oil pump M/O/P, a first oil passage 101, a first flapper valve 101a, a second oil passage 102, a second flapper valve 102a, a third oil passage 103, a line pressure regulating valve 104, a line pressure oil passage 105, a cooling system oil passage 106 and the switching valve 107.

The first oil passage 101 is connected to a discharge port 110a of the mechanical oil pump O/P, and a suction circuit 109a which sucks hydraulic fluid collected in an oil pan 108 is connected to a suction port 110b of the mechanical oil pump O/P. This mechanical oil pump O/P is driven by the rotation drive of the motor/generator MG, and sucks the hydraulic fluid from the oil pan 108 through the suction circuit 109a, and then discharges the hydraulic fluid to the first oil passage 101. The discharge flow rate of the hydraulic fluid at this time depends on the rotation speed of the motor/generator MG.

The second oil passage 102 is connected to a discharge port 111a of the electric oil pump M/O/P, and the suction circuit 109a which sucks the hydraulic fluid collected in the oil pan 108 is connected to a suction port 111b of the electric oil pump M/O/P. This electric oil pump M/O/P is driven by the rotation drive of the sub-motor S/M, and sucks the hydraulic fluid from the oil pan 108 through the suction circuit 109a, and then discharges the hydraulic fluid to the second oil passage 102.

Here, the discharge flow rate of the hydraulic fluid of the electric oil pump M/O/P depends on the rotation speed of the pump. That is, the flow rate of the hydraulic fluid discharged from the electric oil pump M/O/P is determined by one rotation of the electric oil pump M/O/P, and the pump rotation speed and the pump discharge flow rate are in a proportional relation until a certain rotation speed (flow rate).

Moreover, this electric oil pump M/O/P is one whose discharge flow rate is larger than an electric oil pump generally used at the time of idle stop control. That is, by only the electric oil pump M/O/P, it is possible to perform hydraulic supply which is capable of covering oil pressure required to engage the second clutch CL2 and to shift the continuously variable transmission CVT. With this, the starting of the vehicle can be possible while stopping the mechanical oil pump O/P, or even if the discharge flow rate of the mechanical oil pump O/P is extremely small.

One end of the first oil passage 101 is connected to the discharge port 110a of the mechanical oil pump O/P, and the other end of the first oil passage 101 is provided with the first flapper valve 101a. This first oil passage 101 is an oil passage through which the hydraulic fluid discharged from the mechanical oil pump O/P flows, and an oil pressure (hereinafter, it is called as "first oil pressure P1") in the first oil passage 101 becomes a so-called oil pressure (first oil pump discharge pressure) supplied from the mechanical oil pump O/P. This first oil passage 101 communicates with the third oil passage 103 when the first flapper valve 101a is opened.

One end of the second oil passage 102 is connected to the discharge port 111a of the electric oil pump M/O/P, and the other end of the second oil passage 102 is provided with the second flapper valve 102a. This second oil passage 102 is an oil passage through which the hydraulic fluid discharged from the electric oil pump M/O/P flows. An oil pressure in this second oil passage 102 becomes a so-called oil pressure (hereinafter, it is called as "second oil pressure P2") supplied from the electric oil pump M/O/P. This second oil passage 102 communicates with the third oil passage 103 when the second flapper valve 102a is opened.

In addition, the switching valve 107 is interposed at the middle position of the second oil passage 102. That is, the second oil passage 102 is divided at the middle position, and one of the second oil passage 102 is connected to a switching valve input port 107a of the switching valve 107, and the other of the second oil passage 102 is connected to a switching valve output port 107b of the switching valve 107.

Moreover, the second oil passage 102 is provided with a second pressure sensor 27 that detects the second oil pressure P2 and a pressure leak valve 27a. When the second oil pressure P2 which is monitored by the second pressure sensor 27 reaches a predetermined relief pressure $P_{re}$, the pressure leak valve 27a is opened, and the hydraulic fluid inside the second oil passage 102 is drained.

The first flapper valve 101a is a valve to prevent the backflow of the hydraulic fluid to the mechanical oil pump O/P side, and has characteristics in which the first flapper valve 101a is opened when the first oil pressure P1 becomes higher than an oil pressure (hereinafter, it is called as "third oil pressure P3") in the third oil passage 103. In addition, the second flapper valve 102a is a valve to prevent the backflow of the hydraulic fluid to the electric oil pump M/O/P side, and has characteristics in which the second flapper valve 102a is opened when the second oil pressure P2 becomes higher than the third oil pressure P3.

Here, the degree of the third oil pressure P3 is determined by a higher oil pressure of the first oil pressure P1 and the second oil pressure P2. That is, if the oil pressure of the first oil pressure P1 is higher than that of the second oil pressure P2, the first flapper valve 101a is opened and the second flatter valve 102a is closed, and if the oil pressure of the second oil pressure P2 is higher than that of the first oil pressure P1, the second flapper valve 102a is opened and the first flapper valve 101a is closed. With this, the third oil pressure P3 becomes the same oil pressure as that of the oil passage provided with the opened flapper valve.

In addition, both of the first and the second flapper valves 101a and 102a are opened when there is no oil pressure difference between the first oil pressure P1 and the second oil pressure P2. If the oil pressure of either one of the first oil pressure P1 or the second oil pressure P2 becomes higher from a state in which there is no oil pressure difference therebetween, based on this oil pressure difference, the opening degree of the flapper valve corresponding to the higher oil pressure gradually becomes large, and the other flapper valve is gradually closed.

One end of the third oil passage 103 is bifurcated, one of which is connected to the first flapper valve 101a and the other of which is connected to the second flapper valve 102a, and thereby the inflow of the hydraulic fluid from both of the first oil passage 101 and the second oil passage 102 can be possible. The other end of the third oil passage 103 is connected to an input port 104a of the line pressure regulating valve 104. That is, this third oil passage 103 is an oil passage through which the hydraulic fluid discharged from the hydraulic supply source OIL (mechanical oil pump O/P and/or electric oil pump M/O/P) flows, and the third oil pressure P3 that is an oil pressure in the third oil passage 103 becomes the original pressure of the line pressure PL regulated by the line pressure regulating valve 104.

The line pressure regulating valve 104 is a pressure regulating valve which generates the line pressure PL supplied to the transmission mechanism hydraulic system Sup by regulating the pressure of the third oil pressure P3.

That is, the third oil passage 103 is connected to the input port 104a of the line pressure regulating valve 104, and the line pressure oil passage 105 connected to the transmission mechanism hydraulic system Sup is connected to an output port 104b of the line pressure regulating valve 104. In this line pressure regulating valve 104, a spool is moved by the command value from the integrated controller 10, and the hydraulic fluid inside the third oil passage 103 is released to a drain circuit which is not shown in the drawings, and the pressure of the line pressure PL is regulated.

In addition, the line pressure oil passage 105 is provided with a pressure regulating valve 105a, and a surplus pressure obtained by subtracting an oil pressure required for the transmission mechanism hydraulic system Sup from the line pressure PL is released to the cooling/lubricating system Lub of the transmission mechanism.

One end of the cooling system oil passage 106 is connected to a cooling side port 107c of the switching valve 107, and the other end of the cooling system oil passage 106 is connected to the cooling/lubricating system Lub of the transmission mechanism. When the switching valve 107 is switched to a cooling mode, the hydraulic fluid discharged from the electric oil pump M/O/P is supplied to the cooling/lubricating system Lub of the transmission mechanism.

The hydraulic fluid used in the cooling/lubricating system Lub of the transmission mechanism is collected into the oil pan 108 through a drain circuit 109b.

The switching valve 107 is disposed on the second oil passage 102, and the switching valve 107 is formed to supply the hydraulic fluid discharged from the electric oil pump M/O/P to the third oil passage 103, and to supply the hydraulic fluid discharged from the electric oil pump M/O/P to the cooling/lubricating system Lub of the transmission mechanism, based on a switching command from the integrated controller 10.

That is, this switching valve 107 has an on-off solenoid and a switching valve, and when the switching valve input port 107a is communicated with the switching valve output port 107b, the second oil passage 102 is completely opened. In addition, when the switching valve input port 107a is communicated with the cooling side port 107c, the second oil passage 102 is switched to the cooling system oil passage 106.

In addition, the transmission mechanism hydraulic system Sup has a pressure regulating valve 112a for the transmission mechanism which is provided on the line pressure oil passage 105 and a pressure regulating valve 112b for the second clutch which is provided on the line pressure oil passage 105. By the transmission mechanism pressure regulating valve 112a, the oil pressure which is supplied to the primary pulley Pri and the secondary pulley Sec is regulated using the line pressure PL as original pressure, and the hydraulic supply to the primary pulley Pri and the secondary pulley Sec is performed. In addition, by the second clutch pressure regulating valve 112b, the oil pressure which is supplied to the forward clutch FC and the reverse brake RB is regulated using the line pressure PL as original pressure, and the hydraulic supply to the forward clutch FC and the reverse brake RB is performed.

[Control Processing Configuration at Time of Starting of Vehicle]

Figure 3:
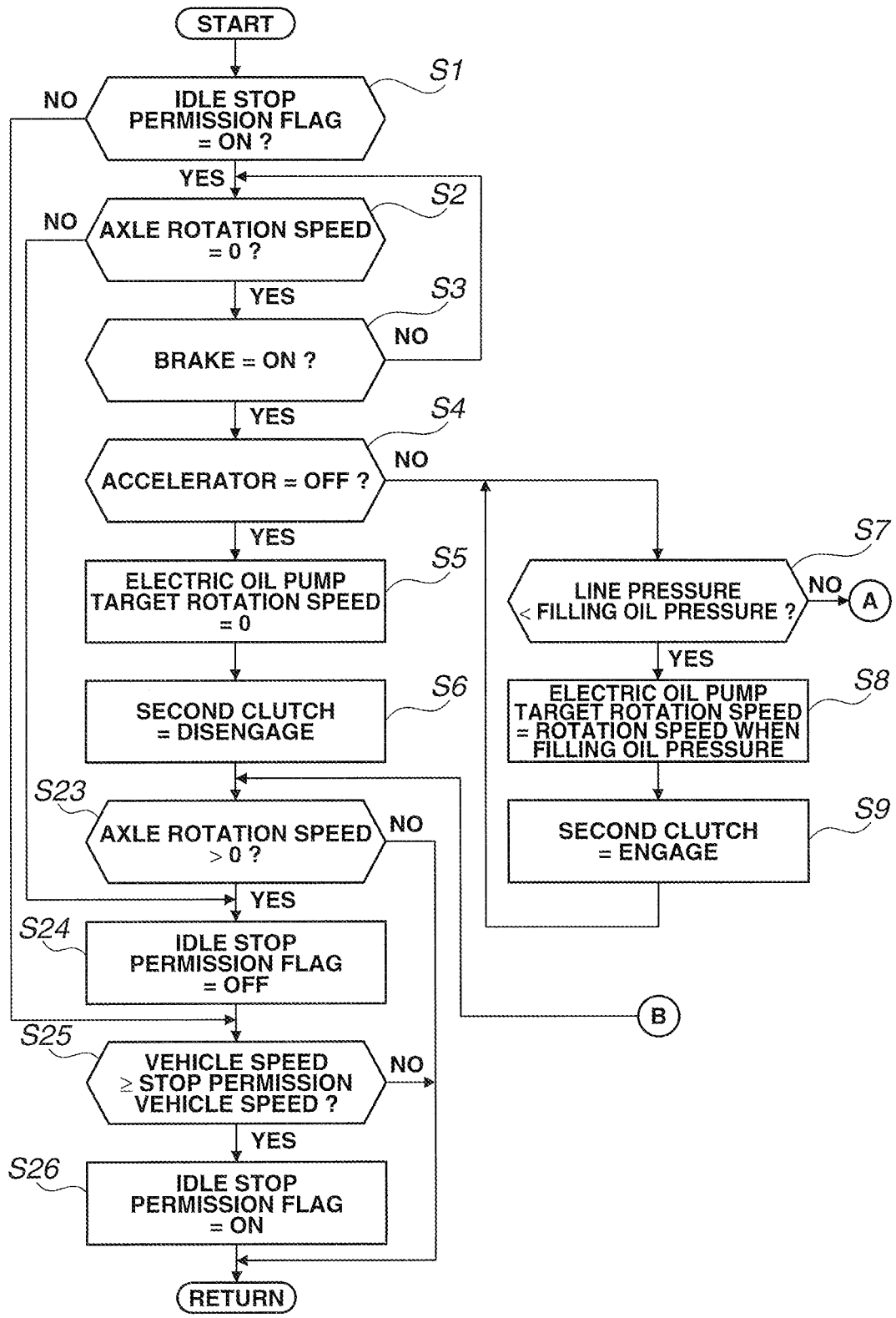
FIG. 3 is a flow chart showing a flow of a control processing at the time of the start of the vehicle which is executed by an integrated controller of the embodiment.
Figure 4:
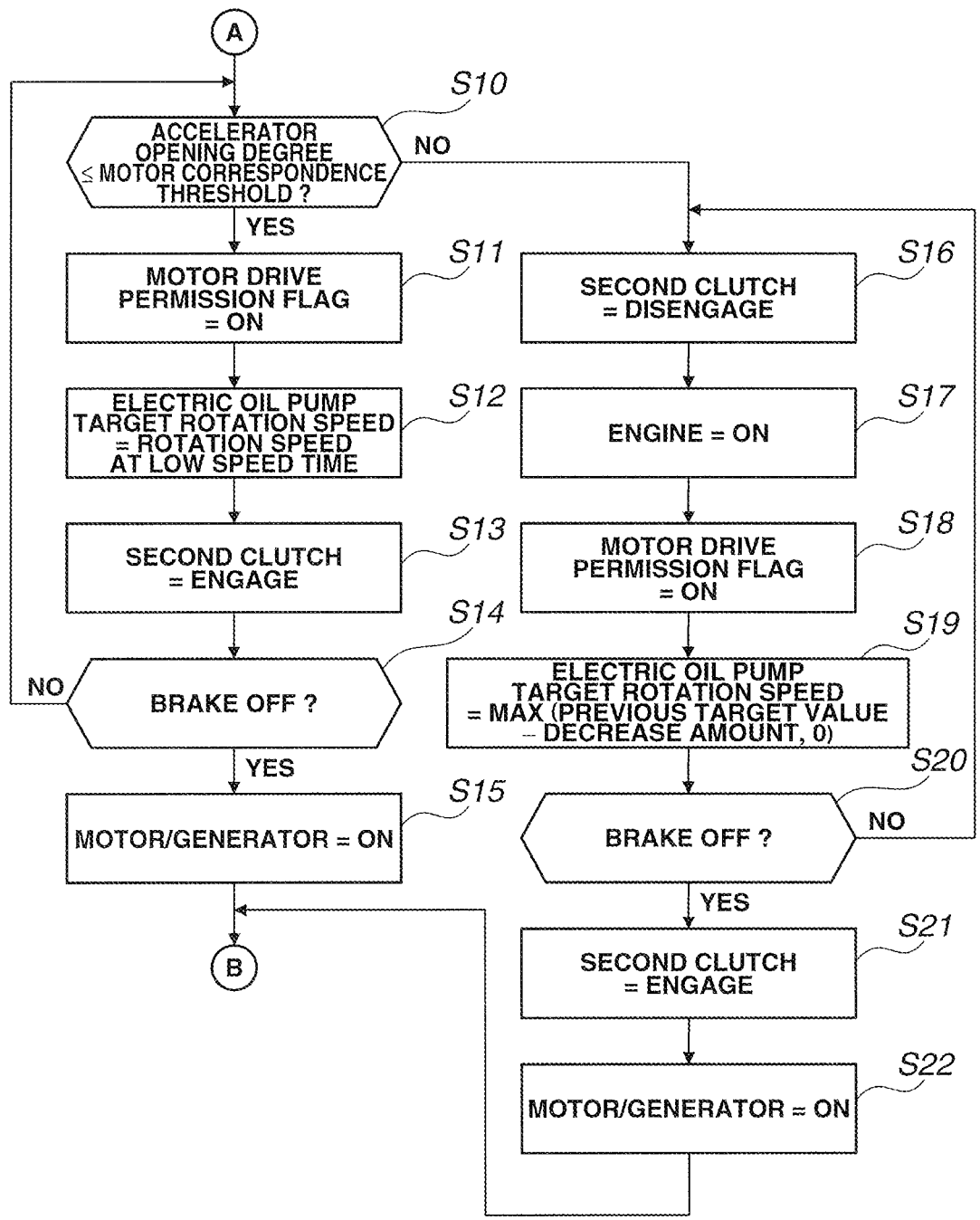
FIG. 4 is a flow chart showing a flow of a control processing at the time of the start of the vehicle which is executed by the integrated controller of the embodiment.

FIG. 3 and FIG. 4 are flow charts showing flow of control processing at the time of the starting of the vehicle, control processing which is executed by the integrated controller 10 of the embodiment. In the following, each step in FIG. 3 and FIG. 4 showing the control processing configuration at the time of the starting of the vehicle will be explained.

In a step S1, it is judged whether or not an idle stop permission flag is ON. In a case of YES (permission flag=ON), the step proceeds to a step S2. In a case of NO (permission flag=OFF), the step proceeds to a step S25.

Here, "idle stop permission flag" is a flag for permitting the stop of all of the engine Eng, the motor/generator MG and the sub-motor S/M, and idle stop control is executed when this flag is ON.

In the step S2, after the judgement that the idle stop permission flag is ON in the step S1, it is judged whether or not the rotation speed of an axle is zero, that is, it is judged whether or not the vehicle is stopped. In a case of YES (axle rotation speed=0), it is judged that the vehicle is during stopping, and the step proceeds to a step S3. In a case of NO (axle rotation speed>0), it is judged that the vehicle is during traveling, and the step proceeds to a step S24.

Here, the rotation speed of the axle is judged based on the second clutch output rotation speed detected by the second clutch output rotation speed sensor 24.

In the step S3, after the judgement that the axle rotation speed is zero in the step S2, it is judged whether or not a brake is in an on-state, that is, it is judged whether or not the brake pedal is depressed. In a case of YES (brake=ON), the step proceeds to a step S4. In a case of NO (brake=OFF), the step returns to the step S2.

Here, a brake state is detected by a brake switch 28.

In the step S4, after the judgement that the brake is ON in the step S3, it is judged whether or not an accelerator is in an off-state, that is, in an accelerator foot-off state. In a case of YES (accelerator=OFF), it is judged that the vehicle is in a complete stop state in which there is no drive request from the driver, and the step proceeds to a step S5. In a case of NO (accelerator=ON), it is judged that drive force request during stopping is made (the driver wants to start the vehicle at the same time when the brake becomes OFF), and the step proceeds to a step S7.

Here, an accelerator state is detected by the accelerator opening degree sensor 21.

In the step S5, after the judgement that the accelerator is OFF in the step S4, the target rotation speed of the electric oil pump M/O/P is set to zero, and the sub-motor S/M is stopped (non-driven state), and the step proceeds to a step S6. In addition, at this time, the motor/generator MG and the engine Eng are also stopped (non-driven state) to perform the idle stop control. With this, the mechanical oil pump O/P and the electric oil pump M/O/P are not operated, and the supply of the hydraulic fluid from the hydraulic supply source OIL is stopped.

In addition, by stopping the supply of the hydraulic fluid from the hydraulic supply source OIL, the hydraulic fluid is released from the circuits of the third oil passage 103, the line pressure oil passage 105 and the inside of the transmission mechanism hydraulic system Sup, and the line pressure PL and the oil pressure which is supplied to the primary pulley Pri, the secondary pulley Sec and the second clutch CL2 (forward clutch FC and reverse brake RB) are lowered.

In the step S6, after the target rotation speed of the electric oil pump M/O/P is set to zero in the step S5, a disengagement command is output to the second clutch CL2 (forward clutch FC or reverse brake RB), and the step proceeds to a step S23.

With this command, the second clutch CL2 is disengaged, and a power transmission route from the traveling drive source (engine Eng, motor/generator MG) to the left and right drive wheels LT and RT is shut off.

In the step S7, after the judgement that the accelerator is ON in the step S4, that is, the accelerator pedal is depressed while the brake pedal is still depressed, it is judged whether or not the line pressure PL is lower than a preset filling oil pressure $P_{Full}$. In a case of YES (line pressure≤filling oil pressure), it is judged that the hydraulic fluid is not filled inside the transmission mechanism hydraulic system Sup, and the step proceeds to a step S8. In a case of NO (line pressure filling oil pressure), it is judged that the hydraulic fluid is filled inside the transmission mechanism hydraulic system Sup, and the step proceeds to a step S10.

Here, "fulling oil pressure $P_{Full}$" is a value at which it can be judged that the hydraulic fluid is filled in the transmission mechanism hydraulic system Sup, especially in the line pressure oil passage 105, and it is set arbitrarily.

In the step S8, after the judgement that the line pressure PL is lower than the fulling oil pressure $P_{Full}$ in the step S7, that is, the hydraulic fluid is not filled in the transmission mechanism hydraulic system Sup, the target rotation speed of the electric oil pump M/O/P is set at a rotation speed $N_{max}$ at the time of the filling of the oil pressure, and the sub-motor S/M is driven, and the step proceeds to a step S9.

Here, "rotation speed $N_{max}$ at time of filing of oil pressure" is the maximum rotation speed of the electric oil pump M/O/P, and is a value at which quick fulling of the hydraulic fluid can be possible. With this, the line pressure PL rises rapidly.

In the step S9, after the electric oil pump target rotation speed is set at the rotation speed $N_{max}$ at the time of the filling of the oil pressure in the step S8, an engagement command is output to the second clutch CL2, and the step returns to the step S7.

With this command, the second clutch CL2 is engaged, and the power transmission route from the traveling drive source (engine Eng, motor/generator MG) to the left and right drive wheels LT and RT is connected.

In the step S10, after the judgment that the line pressure PL is at the fulling oil pressure $P_{Full}$ or higher in the step S7, that is, the hydraulic fluid is filled in the transmission mechanism hydraulic system Sup, it is judged whether or not the accelerator opening degree of the depressed accelerator pedal is at a threshold $APO_{th}$ corresponding to the motor or less. In a case of YES (accelerator opening degree≤motor correspondence threshold), it is judged that it is possible to respond to the drive force requested by the driver by only the output torque of the motor/generator MG (the engine torque is not necessary), the step proceeds to a step S11. In a case of NO (accelerator opening degree>motor correspondence threshold), it is judged that it is not possible to respond to the drive force requested by the driver by only the output torque of the motor/generator MG (the engine torque is necessary), the step proceeds to a step S16.

Here, "motor correspondence threshold $APO_{th}$" is a value at which it is judged that the requested drive force can be covered by only the maximum output torque of the motor/generator MG (maximum motor torque), and it is set based on the rating of the motor/generator MG, a battery residual capacity, etc.

In the step S11, after the judgement that the accelerator opening degree is at the motor correspondence threshold $APO_{th}$ or less in the step S10, a motor drive permission flag is set to ON, and the step proceeds to a step S12.

Here, "motor drive permission flag" is a flag that makes the drive of the motor/generation MG possible when a predetermined condition is satisfied.

In the step S12, after the motor drive permission flag is set to ON in the step S11, the target rotation speed of the electric oil pump M/O/P is set at a rotation speed $N_{Low}$ at low speed, and the sub-motor S/M is driven, and the step proceeds to a step S13.

Here, "rotation speed $N_{Low}$ at low speed" is a rotation speed which maintains the second clutch CL2 to an engaged state and which sets a second clutch transmission capacity to a value corresponding to a relatively low requested drive force.

In the step S13, after the electric oil pump target rotation speed is set to the rotation speed $N_{Low}$ at low speed, an engagement command is output to the second clutch CL2, and the step proceeds to a step S14.

With this command, the second clutch CL2 is engaged, and the power transmission route from the traveling drive source (engine Eng, motor/generator MG) to the left and right drive wheels LT and RT is connected.

In the step S14, after the command for the engagement of the second clutch CL2 is output in the step S13, it is judged whether or not the brake is in an off-state, that is, the brake pedal is released. In a case of YES (brake=OFF), it is judged that starting request is made, and the step proceeds to a step S15. In a case of NO (brake=ON), it is judged that the starting request is not made, and the step returns to the step S10.

In the step S15, after the judgment that the brake is OFF in the step S14, that is, the starting request is made, the motor/generator MG is driven, and the step proceeds to a step S23.

Here, the output torque of the motor/generator MG becomes a value corresponding to a requested drive force of the driver depending on an accelerator opening degree. In addition, by driving the motor/generator MG, the drive of the mechanical oil pump O/P is started, and the hydraulic supply is also performed by the mechanical oil pump O/P.

In the step S16, after the judgement that the accelerator opening degree is greater than the motor correspondence threshold $APO_{th}$ in the step S10, a disengagement command is output to the second clutch CL2, and the step proceeds to a step S17.

With this command, the second clutch CL2 is disengaged, and the power transmission route from the traveling drive source (engine Eng, motor/generator MG) to the left and right drive wheels LT and RT is shut off.

In the step S17, after the command for the disengagement of the second clutch CL2 is output in the step S16, the engine Eng is stated, and the step proceeds to a step S18.

Here, the starting of the engine Eng is performed by using the motor/generator MG as an engine start motor. That is, the first clutch CL1 is engaged, and the output torque of the motor/generator MG is transmitted to the engine Eng, and then the engine Eng is started.

In the step S18, after the engine start in the step S17, a motor drive permission flag is set to ON, and the step proceeds to a step S19.

In the step S19, after the motor drive permission flag is set to ON in the step S18, the target rotation speed of the electric oil pomp M/O/P is set to a larger value of a value, which is obtained by subtracting a predetermined decrease amount from the previous target value, and zero, and the step proceeds to a step S20.

Here, "decrease amount" is a value at which it is possible to gradually decrease the discharge flow rate of the electric oil pump M/O/P, and it is set arbitrarily.

In the step S20, after the electric oil pump target rotation speed is set in the step S19, it is judged whether or not the brake is in an off-sate, that is, the brake pedal is released. In a case of YES (brake=OFF), it is judged that starting request is made, and the step proceeds to a step S21. In a case of NO, (brake=ON), it is judged that the starting request is not made, and the step returns to the step S16.

In the step S21, after the judgment that the brake is OFF in the step S20, that is, the starting request is made, an engagement command is output to the second clutch CL2, and the step proceeds to a step S22. With this command, the second clutch CL2 is engaged, and the power transmission route from the traveling drive source (engine Eng, motor/generator MG) to the left and right drive wheels LT and RT is connected.

In the step S22, after the command for the engagement of the second clutch CL2 is output in the step S21, the motor/generator MG is driven, and the step proceeds to a step S23.

Here, the output torque of the motor/generator MG becomes a value according to a value obtained by subtracting the output torque of the engine Eng from the requested drive force of the driver depending of an accelerator opening degree. That is, the requested drive force is covered by the engine Eng and the motor/generator MG. If it is possible to cover the requested drive force by only the output torque of the engine Eng, the motor/generator MG is stopped (in a co-rotation state). In addition, by driving the engine Eng and/or the motor/generator MG, the drive of the mechanical oil pump O/P is started, and then the hydraulic supply is performed also from the mechanical oil pump O/P.

In the step S23, after either the output of the command for the disengagement of the second clutch in the step S6 or the output of the drive command of the motor/generator MG in the step S15 or in the step S22, it is judged whether or not the rotation speed of the axle exceeds zero, that is, the vehicle is during travel. In a case of YES (axle rotation speed>0), it is judged that the vehicle is during travel, and the step proceeds to a step S24. In a case of NO (axle rotation speed=0), it is judged that the vehicle is during stopping, and the step proceeds to a return.

In the step S24, after the judgment that the axle rotation speed exceeds zero in the step S23, the idle stop permission flag is set to OFF, and the step proceeds to a step S25.

With this setting, even if an idle stop condition is satisfied, all of the engine Eng, the motor/generator MG and the sub-motor S/M are not stopped.

In the step S25, after the idle stop permission flag is set to OFF in the step S24, it is judged whether or not a vehicle speed is at a predetermined stop permission vehicle speed $VSP_{th}$ or greater. In a case of YES, (vehicle speed stop permission vehicle speed), it is judged that it is possible to obtain the effect of fuel saving by stopping the engine Eng and the motor/generator MG, and the step proceeds to a step S26. In a case of NO, (vehicle speed<stop permission vehicle speed), it is judged that it is not possible to obtain the effect of the fuel saving even if the engine Eng and the motor/generator MG are stopped, and the step proceeds to the return.

Here, "stop permission vehicle speed $VSP_{th}$" is a vehicle speed at which it is possible to judge that the fuel saving effect obtained by the idle stop control is high without unnecessarily increasing the spot frequency of the engine Eng and the motor/generator MG, and it is set arbitrarily.

In the step S26, after the judgment that the vehicle speed is at the stop permission vehicle speed or greater, the idle stop permission flag is set to ON, and the step proceeds to the return.

With this setting, if the idle stop condition is satisfied, all of the engine Eng, the motor/generator MG and the sub-motor S/M are stopped.

Next, action will be explained.

First, a configuration and a problem in a starting control device for a vehicle of a comparative embodiment will be explained, following which action in the starting control device for the vehicle in the embodiment will be explained by dividing it into "responsiveness improving action at time of starting of vehicle when requested drive force is low" and "responsiveness improving action at time of starting of vehicle when requested drive force is high"

[Configuration and Problem in Starting Control Device for Vehicle of Comparative Embodiment]

In a vehicle in which a first oil pump driven by a traveling drive source and a second oil pump driven by an electric motor are provided, a starting control device is considered as a comparative embodiment, starting control device which performs hydraulic supply by the first oil pump by driving the traveling drive source before a brake pedal is released, when an accelerator pedal is depressed in a state in which the brake pedal has been depressed during the stopping of the vehicle by depressing the brake pedal.

In such the starting control device of the comparative embodiment, it can be considered that it is possible to improve the responsiveness of a driving force by starting the hydraulic supply before the brake pedal is released. However, since the traveling drive source is driven before the start of the vehicle, it is not preferable from the viewpoint of fuel saving.

In addition, in a case where the traveling drive source which drives the first oil pump is an engine, a time lag until the engine is started by, for example, cranking, fuel injection and complete explosion is larger than that of a motor, and it requires a certain time for the hydraulic supply. A problem therefore occurs that it is not possible to improve the responsiveness of the drive force, if the brake pedal is released before sufficient hydraulic supply is performed by the first oil pump.

On the other hand, in a case where the traveling drive source which drives the first oil pump is an electric motor (motor for traveling), the responsiveness of the electric motor to a command is higher than that of the engine. However, drive source torque is generated by the drive of the traveling drive source. It is therefore necessary to prevent the drive source torque from being transmitted to drive wheels before the release of the brake pedal. Consequently, a starting clutch must be released, and a time lag caused by clutch engagement at the time of the starting of the vehicle occurs, and the responsiveness of the drive force becomes low.

In addition, in a case where the starting clutch stands by in a slip-engagement state to shorten the engagement time of the starting clutch at the time of the starting of the vehicle, a problem occurs that the starting clutch is heated by friction heat, and clutch durability lowers.

[Responsiveness Improving Action at Time of Starting of Vehicle when Requested Drive Force is Low]

Figure 5:
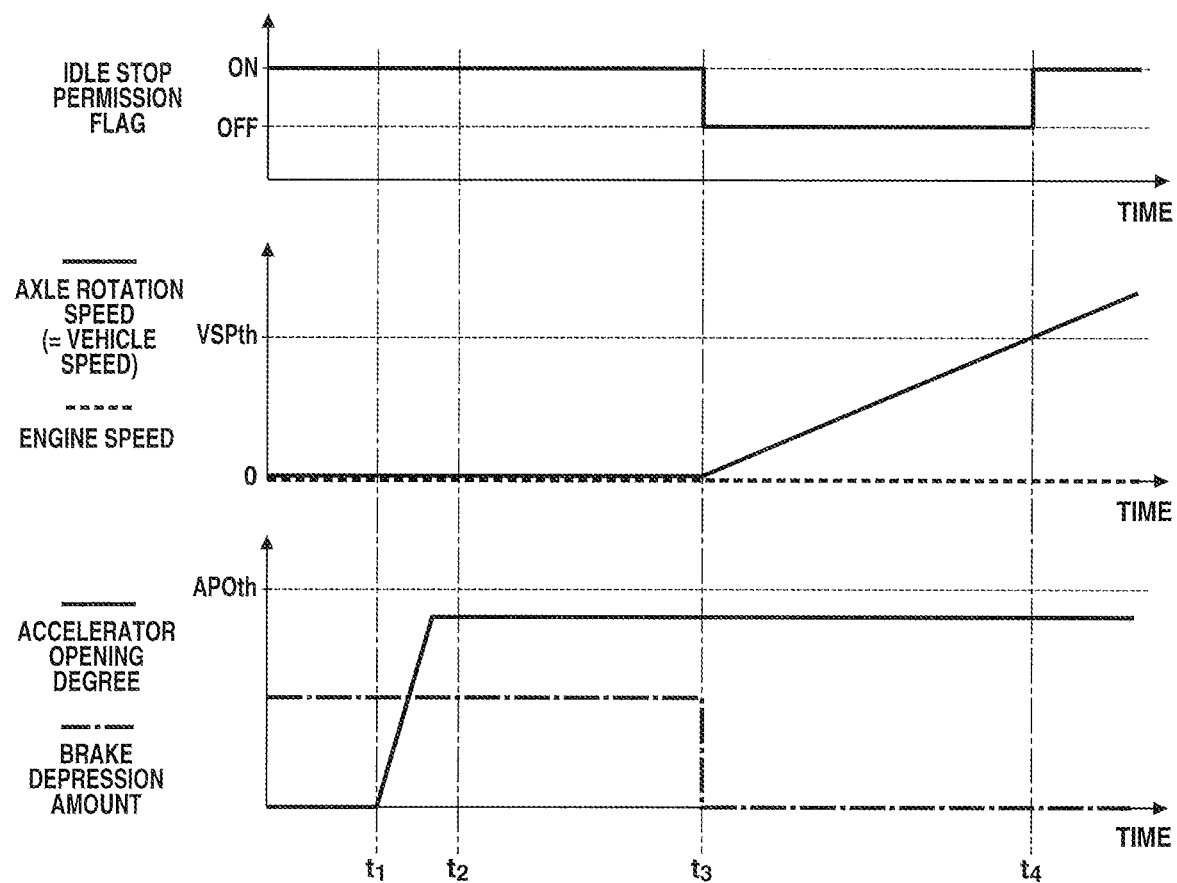
FIG. 5 is a time chart showing each characteristic of an idle stop permission flag, an axle rotation speed, an engine speed, an accelerator opening degree and a brake depression amount when a requested drive force at the time of the start of the vehicle is low in the control device of the embodiment.
Figure 6:
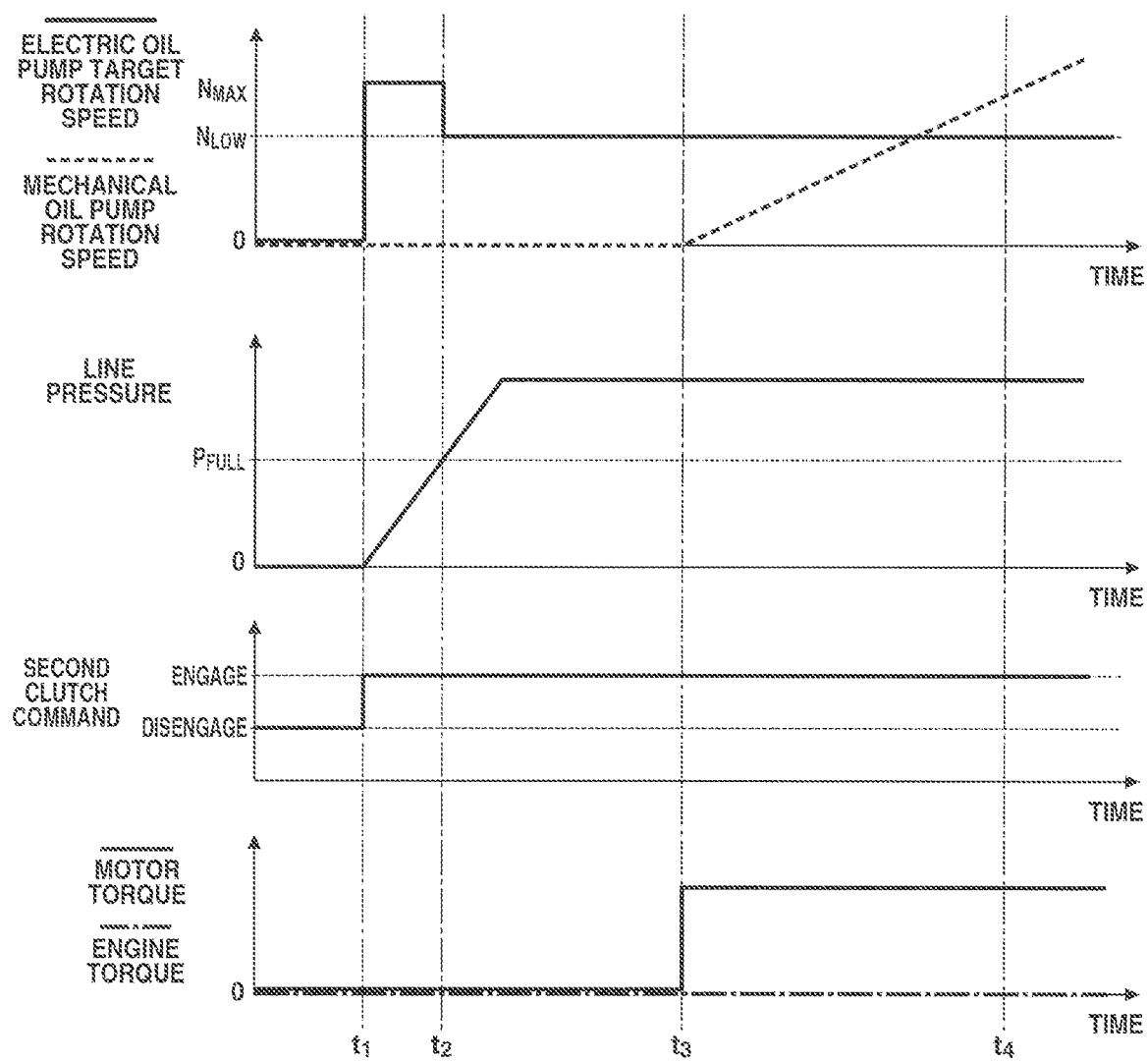
FIG. 6 is a time chart showing each characteristic of a target rotation speed of an electric oil pump, a rotation speed of a mechanical oil pump, line pressure, a second clutch command, motor torque and engine torque when the requested drive force at the time of the start of the vehicle is low in the control device of the embodiment.

FIG. 5 and FIG. 6 are time charts showing each characteristic of the idle stop permission flag, the axle rotation speed, the engine speed, the accelerator opening degree, the brake depression amount, the electric oil pump target rotation speed, the mechanical oil pump rotation speed, the line pressure, the second clutch command, the motor torque and the engine torque, when the requested drive force is low at the time of the starting of the vehicle in the control device of the embodiment. In the following, based on FIG. 5 and FIG. 6, in the embodiment, the responsiveness improving action at the time of the starting of the vehicle when the requested drive force is low will be explained.

Before a time $t_1$ in each of FIG. 5 and FIG. 6, a case is assumed that the vehicle speed exceeds the stop permission vehicle speed $VSP_{th}$ while the vehicle is traveling, and then the vehicle is stopped in a state in which the idle stop permission flag has become ON.

At this time, since the idle stop permission flag is ON, in the flow chart shown in FIG. 3, the step proceeds from the step S1 to the step S2. Before the time $t_1$, since the vehicle is stopping in a state in which the brake pedal has been depressed and the accelerator pedal has not been depressed, the step proceeds from the step S2 to the step S5 through the step S3 and the step S4.

With this, the target rotation speed of the electric oil pump M/O/P is set to zero, and the sub-motor S/M is stopped. In addition, at this time, since the idle stop control is performed, the moto/generator MG and the engine Eng as the traveling device source are also stopped, and the mechanical oil pump O/P is also stopped. After that, the step proceeds to the step S6, and the disengagement command is output to the second clutch CL2 as the starting clutch.

As a result of this, it is possible to suppress useless consumption of fuel, and thereby the fuel economy can be improved. On the other hand, by stopping the hydraulic supply from the hydraulic supply source OIL, the hydraulic fluid inside the hydraulic control circuit 100 is released by leaking. However, inconvenience does not occur by outputting the disengagement command to the second clutch CL2.

After that, the step proceeds to the step S23. However, before the time $t_1$, the vehicle is stopping, and the axle is not rotated. The step therefore proceeds to the return, and a process from the step S1 is continued.

At the time point of the time $t_1$ shown in each of FIG. 5 and FIG. 6, when the accelerator pedal is depressed in a state in which the brake pedal has been depressed, the accelerator opening degree is generated.

With this generation, it is judged that the accelerator pedal is ON, and the step proceeds from the step S4 to the step S7. At the time point of the time $t_1$, since the hydraulic supply from the hydraulic supply source OIL has been stopped, the line pressure PL is zero, and the line pressure PL becomes lower than the filling oil pressure $P_{Full}$. Accordingly, the step proceeds from the step S7 to the step S8, and the target rotation speed of the electric oil pump M/O/P is set at the rotation number $N_{max}$ at the time of the filing of the oil pressure, and the hydraulic supply is performed from the electric oil pump M/O/P by driving the sub-motor S/M.

Here, the sub-motor S/M is a three-phase AC motor, and the responsiveness of the but-motor S/M to the command is extremely high (quick) compared with that of the engine. The electric oil pump rotation speed therefore rises quickly, and by quickly starting the hydraulic supply from the electric oil pump M/O/P, the second oil pressure P2 rises, and the second flapper valve 102a is opened, and thereby the line pressure PL (oil pressure supplied to second clutch CL2) can be increased.

With this, for example, as compared with a case where the line pressure PL is secured by the hydraulic supply from the mechanical oil pump O/P by starting the engine Eng as the traveling drive source, it is possible to shorten a time lag from the receiving of the drive command of the oil pump to the hydraulic supply. As this result, as compared with a case where the mechanical oil pump O/P is driven by the engine Eng, the transmission responsiveness of the drive force can be improved, and thereby starting performance can be improved.

In addition, since the line pressure PL is secured by the oil pressure supplied from the electric oil pump M/O/P, it is not necessary to drive the mechanical oil pump O/P by driving the engine Eng and the motor/generator MG. Therefore, fuel consumption amount decreases, and it is possible to improve fuel economy.

In addition, when the hydraulic supply from the electric oil pump M/O/P is stated, the step proceeds to the step S9, and the engagement command is output to the second clutch CL2. With this, for example, as compared with a case where the engagement control of the second clutch CL2 is started with the break releasing as a trigger, it is possible to shorten a time until the second clutch CL2 is completely engaged, and thereby it is possible to improve the transmission responsiveness of the drive force.

Moreover, at this time, since the motor/generator MG and the engine Eng as the traveling drive source continue a stopped state, the torque of the traveling drive source is not transmitted to the left and right drive wheels LT and RT.

The second clutch CL2 does not therefore become a slip-engagement state, and the durability of the second clutch CL2 does not deteriorate.

At the time point of a time $t_2$, when the line pressure PL reaches the filling oil pressure $P_{Full}$, the step proceeds from the step S7 to the step S10, and it is judged whether or not the accelerator opening degree is at the motor correspondence threshold $APO_{th}$ or less. At the time point of the time $t_2$, since the accelerator opening degree is at the motor correspondence threshold $APO_{th}$ or less, it is judged that the requested drive force can be covered by only the output torque (motor torque) of the motor/generator MG, and the step proceeds from the step S11 to the step S13 through the step S12. With this, the motor drive permission flag is set to ON, and when a predetermined condition (here, brake OFF) is satisfied, the drive of the motor/generator MG can be possible. In addition, it is judged that the filing of the hydraulic fluid to the line pressure oil passage 105 has been completed, and the target rotation speed of the electric oil pump M/O/P is set at the rotation speed $N_{Low}$ at low speed, and the engaged state of the second clutch CL2 is maintained.

With this, the output of the electric oil pump M/O/P is suppressed, and the line pressure PL is maintained at a required extent while suppressing useless power consumption, and it is possible to prepare for the starting request. Then, the flow from the step S10 to the step S14 through the step S11, the step S12 and the step S13 is continued until the brake pedal is released or the accelerator opening degree exceeds the motor correspondence threshold $APO_{th}$.

In each of FIG. 5 and FIG. 6, at the time point of a time $t_3$, the depression of the brake pedal is released, and the starting request is generated. With this, the step proceeds from the step S14 to the step S15, and the motor/generator MG is driven, and then the vehicle starts by the motor torque. That is, the vehicle starts in "EV mode". Here, the command responsiveness of the motor/generator MG is higher than that of the engine Eng, and it is therefore possible to perform the torque output quickly. In addition, at this time, the engagement command has already been output to the second clutch CL2 as the starting clutch, and a time lag until the engagement of the clutch hardly occurs. It is therefore possible to secure the responsiveness of the drive force transmission.

Moreover, since the engine Eng is not driven, fuel consumption amount can be suppressed, and it is possible to improve fuel economy.

After that, the step proceeds to the step S23, and when the axle rotates, the step proceeds to the step S24, and the idle stop permission flag is set to OFF. At the time point of a time t4, when the vehicle speed reaches the stop permission vehicle speed $VSP_{th}$ (in FIG. 5, the axle rotation speed proportional to a vehicle speed is a rotation speed corresponding to the stop permission vehicle speed $VSP_{th}$), the step proceeds from the step S25 to the step S26, and the idle stop permission flag is set to ON. With this, when the idle stop condition is satisfied, it is possible to stop all of the engine Eng, the motor/generator MG and the sub-motor S/M.

[Responsiveness Improving Action at Time of Starting of Vehicle when Requested Drive Force is High]

Figure 7:
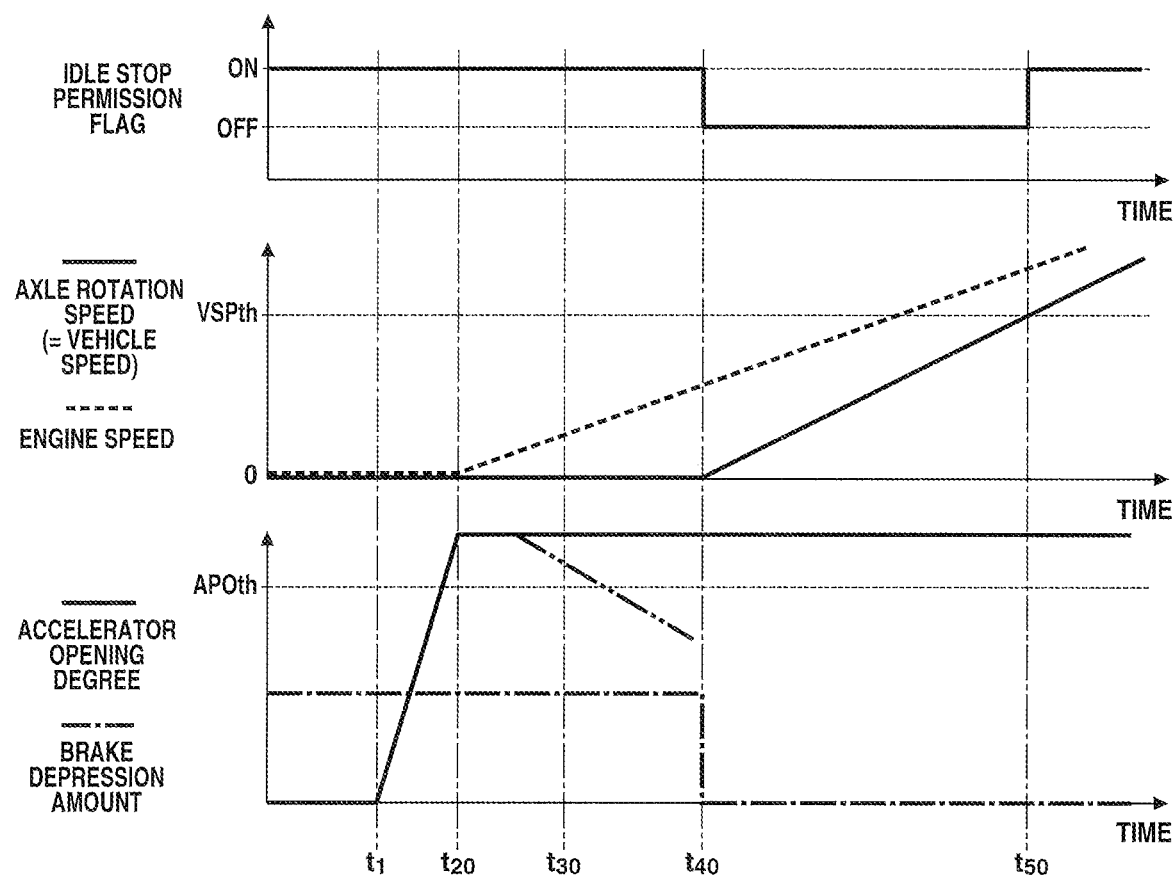
FIG. 7 is a time chart showing each characteristic of the idle stop permission flag, the axle rotation speed, the engine speed, the accelerator opening degree and the brake depression amount when the requested drive force at the time of the start of the vehicle is high in the control device of the embodiment.
Figure 8:
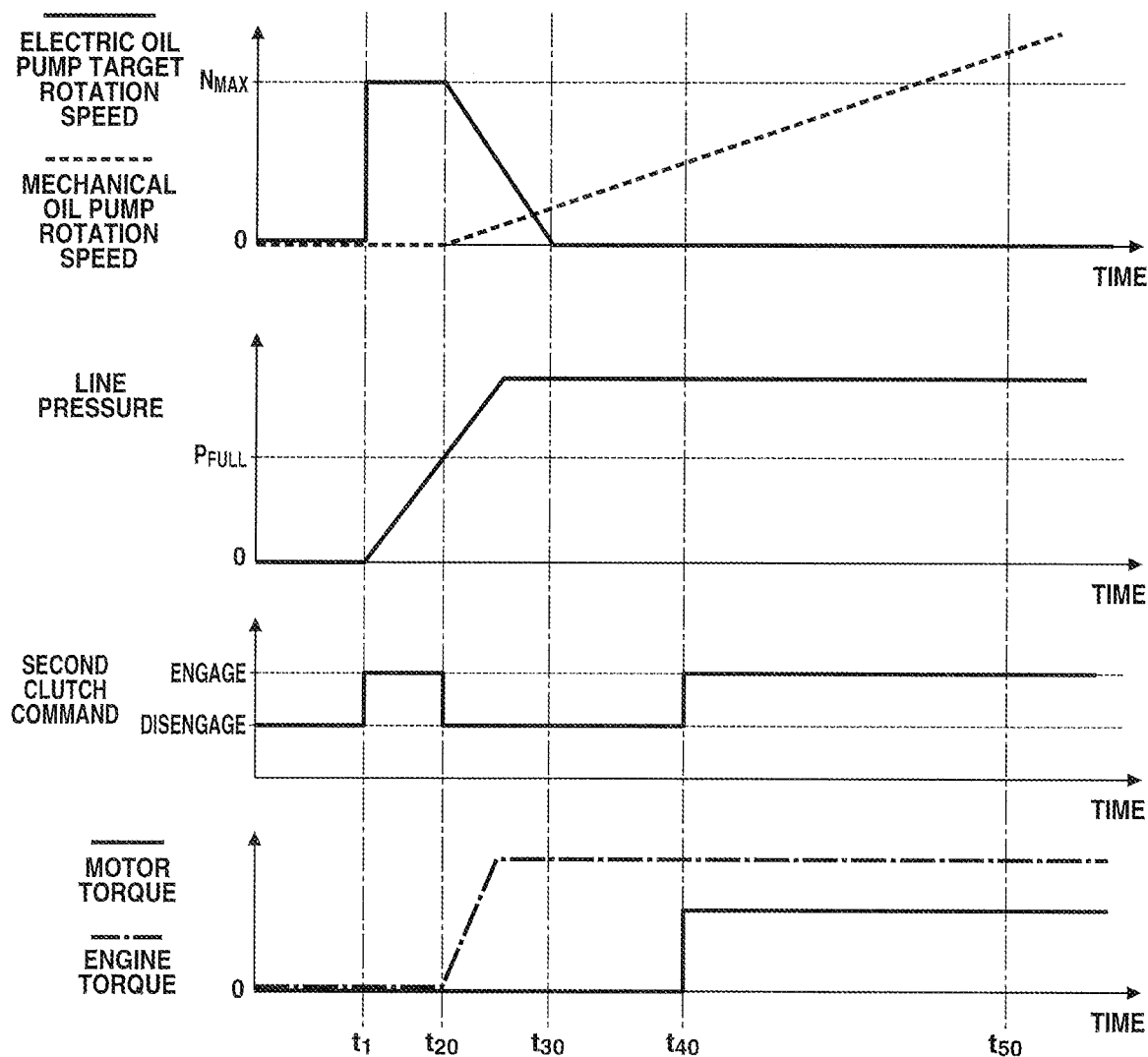
FIG. 8 is a time chart showing each characteristic of the target rotation speed of the electric oil pump, the rotation speed of the mechanical oil pump, the line pressure, the second clutch command, the motor torque and the engine torque when the requested drive force at the time of the start of the vehicle is high in the control device of the embodiment.

FIG. 7 and FIG. 8 are time charts showing each characteristic of the idle stop permission flag, the axle rotation speed, the engine speed, the accelerator opening degree, the brake depression amount, the electric oil pump target rotation speed, the mechanical oil pump rotation speed, the line pressure, the second clutch command, the motor torque and the engine torque, when the requested drive force at the time of the starting of the vehicle is high in the control device of the embodiment. In the following, based on FIG. 7 and FIG. 8, in the embodiment, the responsiveness improving action at the time of the starting of the vehicle when the requested drive force is high will be explained.

In each of FIG. 7 and FIG. 8, operation from before the time $t_1$ to the time $t_1$ is the same as that of the time chart shown in each of FIG. 5 and FIG. 6, and the explanation of the operation is therefore omitted.

At the time point of a time t20 shown in each of FIG. 7 and FIG. 8, when the line pressure PL reaches the filling oil pressure $P_{Full}$, the step proceeds from the step S7 to the step S10, and it is judged whether or not the accelerator opening degree is at the motor correspondence threshold $APO_{th}$ or less. In the time point of the time t20, the accelerator opening degree is greater than the motor correspondence threshold $APO_{th}$, and it is judged that it is not possible to cover the requested drive force by only the output torque (motor torque) of the motor/generator MG.

With this, the step proceeds from the step S10 to the step S16, and the disengagement command is output to the second clutch CL2. At this time, since the hydraulic fluid has been filled in the line pressure oil passage 105, the second clutch CL2 can immediately become the disengaged state, and it is possible to suppress the drive torque from the engine Eng and the motor/generator MG from being transmitted to the left and right drive wheels LT and RT, without becoming the slip-engagement state of the second clutch CL2.

After the disengagement command is output to the second clutch CL2, the step proceeds to the step S17, and the engine Eng is started. At this time, the first clutch is engaged, and the motor/generator MG is used as engine start torque. Although not shown in FIG. 8, at this time, the motor torque to start the engine rises. When the engine Eng is completely exploded, the motor/generator MG is stopped, and the motor torque becomes zero.

However, by maintaining the engaged state of the first clutch CL1, the motor/generator MG becomes a co-rotation state with respect to the engine Eng, and the mechanical oil pump O/P is, as a result, driven rotatably. With this, the rotation speed of the mechanical oil pump O/P rises with the rise of the engine speed.

In addition, this engine starting process may be performed after confirming the actual disengagement of the second clutch CL2. With this, the slip engagement of the second clutch CL2 is surely prevented, and the transmission of the engine torque and the motor torque generated with the engine Eng start to the left and right drive wheels LT and RT is surely prevented, and thereby it is possible to suppress the occurrence of incongruity feeling.

When the engine Eng is stated, the step proceeds from the step S18 to the step S19, and the motor drive permission flag is set to ON, and when the predetermined condition (here, brake OFF) is satisfied, the drive of the motor/generator MG becomes possible. In addition, since the hydraulic supply from the mechanical oil pump O/P can be obtained, the target rotation speed of the electric oil pump M/O/P is gradually lowered, and in the end, it is set to zero and the sub-motor S/M is stopped. With this, at the time point of a time $t_{30}$, the hydraulic fluid supply from the electric oil pump M/O/P is stopped.

In addition, even if the hydraulic supply from the electric oil pump M/O/P is stopped, since the hydraulic supply from the mechanical oil pump O/P is performed, the lowing of the line pressure PL does not occur. That is, the electric oil pump M/O/P is stopped after the mechanical oil pump O/P is driven, and thereby it is possible to suppress occurrence of lack of the oil pressure.

At the time point in a time $t_{40}$, when the depression of the brake pedal is released and the starting request is generated, the step proceeds from the step S20 to the step S22 through the step S21, and the second clutch CL2 is engaged, and then the engine torque is transmitted to the left and right drive wheels LT and RT. In addition, here, the motor/generator MG is driven to cover the requested drive force, and the motor torque is also transmitted to the left and right drive wheels LT and RT. That is, the vehicle starts in "HEV mode".

Here, although the command responsiveness of the engine Eng is lower than that of the motor/generator MG, this engine Eng is started based on the magnitude of the requested drive force before the brake is OFF. It is therefore possible to complete the starting process of the engine Eng already at the time when the starting request is generated by the release of the brake pedal, and thereby the engine torque can be quickly output.

In addition, at the time of the starting request, by transmitting the engine torque and the motor torque to the left and right drive wheels LT and RT, it is possible to surely cover the requested drive force, and the lack of the drive force at the time of the start of the vehicle can be prevented.

After that, the step proceeds to the step S23, and when the axle rotates, the step proceeds to the step S24, and the idle stop permission flag is set to OFF. When the vehicle speed reaches the stop permission vehicle speed $VSP_{th}$ (in FIG. 7, the axle rotation speed proportional to the vehicle speed is a rotation speed corresponding to the stop permission vehicle speed $VSP_{th}$) at the time point of a time $t_{50}$, the step proceeds from the step S25 to the step S26, and the idle stop permission flag is set to ON. With this, if the idle stop condition is satisfied, it is possible to stop all of the engine Eng, the motor/generator MG and the sub-motor S/M.

Next, as shown by a long dashed double-short dashed line in FIG. 7, a case will be explained where even if the accelerator opening degree exceeds the motor correspondence threshold $APO_{th}$ at the time when the line pressure PL reaches the filling oil pressure $P_{Full}$, after that, this accelerator opening degree is below the motor correspondence threshold $APO_{th}$ before the brake pedal is released. That is, it is a case where the accelerator pedal is returned.

In this case, the accelerator opening degree decreases, and the requested drive force is lowered, and then it becomes possible to cover the requested drive force by only the output torque of the motor/generator MG. It is therefore possible to suppress fuel consumption amount by stopping the engine Eng. However, the mechanical oil pump O/P is stopped due to the stop of the engine Eng. It is therefore necessary to drive the sub-motor S/M to drive the electric oil pump M/O/P. That is, if the engine Eng is stopped to improve fuel economy, it becomes necessary to switch a hydraulic source from the mechanical oil pump O/P to the electric oil pump M/O/P.

At this time, due to variety of the supply oil pressure, there is a case where it is not possible to secure an intended hydraulic supply. Moreover, if the starting requested is generated by the release of the brake pedal in a state in which the hydraulic supply has not been secured, slipping occurs in the second clutch L2 and in the continuously variable transmission CVT, and there is a possibility that an intended drive force cannot be transmitted to the left and right drive wheels LT and RT.

In addition, it becomes more remarkable in a case where the requested drive force is repeatedly changed (in a case where the accelerator opening degree varies around the motor correspondence threshold $APO_{th}$).

In contrast to this, in the embodiment, if the accelerator opening degree exceeds the motor correspondence threshold $APO_{th}$ at the time when the line pressure PL reaches the filling oil pressure $P_{Full}$, in the flow chart shown in FIG. 4, the step proceeds from the step S10 to the step S16, and until the brake pedal is released, the flow from the step S16 to the step S20 through the step S17, the step S18 and the step S19 is repeated.

That is, after the accelerator opening degree exceeds the motor correspondence threshold $APO_{th}$, even if the accelerator opening degree becomes below the motor correspondence threshold $APO_{th}$ by the return of the accelerator pedal, the drive of the engine Eng is maintained, and the driving state of the mechanical oil pump O/P is maintained.

With this, the switching of the hydraulic source is not performed, and the hydraulic supply is prevented from becoming unstable, and the occurrence of the slip of the second clutch CL2 can be prevented.

Next, effects will be explained.

In the starting control device for the vehicle of the embodiment, the following listed effects can be obtained.

(1) It is configured that the starting control device for the vehicle includes:

a first oil pump (mechanical oil pump O/P) configured to perform hydraulic supply by being driven by a traveling drive source (motor/generator MG) which becomes a non-driven state during the stopping of the vehicle while a brake pedal is depressed;

a second oil pump (electric oil pump M/O/P) configured to perform the hydraulic supply by being driven by an electric motor (sub-motor S/M) which becomes a non-driven state during the stopping of the vehicle while the brake pedal is depressed, the second oil pump which is provided separately from the traveling drive source (motor/generator MG);

a starting clutch (second clutch CL2) configured to transmit the drive force of the traveling drive source (motor/generator MG) to drive wheels (left and right drive wheels LT, RT) at the time of the starting of the vehicle, the starting clutch which is disposed between the traveling drive source (motor/generator MG) and the drive wheels (left and right drive wheels LT, RT); and a starting controller (integrated controller 10) configured to increase oil pressure supplied to the starting clutch (second clutch CL2) by a second oil pressure P2 (second oil pump discharge pressure) by driving the second oil pump (electric oil pump M/O/P) before the brake pedal is released, when an accelerator pedal is depressed while the brake pedal is still depressed during the stopping of the vehicle.

With this configuration, starting performance can be secured in a case where the accelerator pedal is depressed while the brake pedal is still depressed during the stopping of the vehicle, following which the brake pedal is performed, and the starting of the vehicle is performed.

(2) It is configured that the traveling drive source has an engine Eng and a traveling motor (motor/generator MG), and when an accelerator opening degree at the time of the depression of the accelerator pedal is at a predetermined threshold (motor correspondence threshold $APO_{th}$) or less, the starting controller (integrated controller 10) drives only the traveling motor (motor/generator MG) when the brake pedal is released, and the vehicle starts by the drive force (motor torque) of the traveling motor (motor/generator MG).

With this configuration, in addition to the effect of (1), while suppressing fuel consumption amount, the transmission responsiveness of the drive force at the time of the starting of the vehicle is secured, and the vehicle can start quickly.

(3) It is configured that the traveling drive source has the engine Eng and the traveling motor (motor/generator MG), and when the accelerator opening degree at the time of the depression of the accelerator pedal exceeds the predetermined threshold (motor correspondence threshold $APO_{th}$), after setting the starting clutch (second clutch CL2) to a disengaged state, the starting controller (integrated controller 10) drives the first oil pump (mechanical oil pump O/P) by driving the engine Eng.

With this configuration, in addition to the effect of (1) or (2), while suppressing the incongruity feeling during the stopping of the vehicle, the requested drive force at the time of the starting of the vehicle is secured, and the vehicle can start quickly.

(4) It is configured that after the accelerator opening degree exceeds the predetermined threshold (motor correspondence threshold $APO_{th}$), when the accelerator opening degree becomes below the predetermined threshold (motor correspondence threshold $APO_{th}$) before the brake pedal is released, the starting controller (integrated controller 10) maintains the driven state of the first oil pump (mechanical oil pump O/P) by continuing the drive of the engine Eng.

With this configuration, in addition to the effect of (3), the hydraulic supply is prevented from becoming unstable, and the drive force transmission is certainly performed at the time of the start of the vehicle, and the vehicle can start quickly.

As the above, although the starting control device for the vehicle of the present invention has been explained based on the embodiment, the specific configuration is not limited to the embodiment. For example, a change in design and addition are permitted as long as the configuration is not deviated from the gist of the invention according to each claim in the scope of the claims.

In the embodiment, if the accelerator opening degree is at the motor correspondence threshold $APO_{th}$ or less at the time when the accelerator pedal is depressed in the state in which the brake pedal has been depressed, and the line pressure PL reaches the filling oil pressure $P_{Full}$, the start of the vehicle is performed by the motor/generator MG, and if the accelerator opening degree exceeds the motor correspondence threshold $APO_{th}$ at the time when the line pressure PL reaches the filling oil pressure $P_{Full}$, the engine Eng is started. This has been shown as an example. However, the present invention is not limited to this.

For example, even if the accelerator opening degree at the time when the line pressure PL reaches the filling oil pressure $P_{Full}$ is at the motor correspondence threshold $APO_{th}$ or less, if the accelerator opening degree exceeds the motor correspondence threshold $APO_{th}$ before the brake pedal is released, in the flow chart shown in FIG. 4, the step proceeds from the step S14 to the step S16 through the step S10, and the engine Eng is started at the time when the accelerator opening degree exceeds the motor correspondence threshold $APO_{th}$.

Moreover, in the embodiment, an example has been shown in which in a case where the engine Eng is started when the requested drive force is high during the stop of the vehicle, the electric oil pump M/O/P is stopped before the brake pedal is released. However, the present invention is not limited to this. If the timing when the brake pedal is released is earlier, and the starting request is generated even in a state in which the electric oil pump M/O/P has not been stopped, the second clutch CL2 is immediately engaged, and the motor/generator MG is driven as needed.

In addition, in the embodiment, as the starting clutch, the second clutch CL2 has been shown as an example, second clutch CL2 which is engaged at the time of the start of the vehicle and performs the drive force transmission. However, the present invention is not limited to this. It may be the primary pulley Pri and the secondary pulley Sec of the continuously variable transmission CVT, or may be a combination of the second clutch CL2 and the continuously variable transmission CVT. If a drive force transmission member is a member which transmits drive force by hydraulic supply at the time of the start of the vehicle, it can be used as the starting clutch.

In addition, in the embodiment, an example has been shown in which the starting control device for the vehicle of the present invention is applied to the hybrid vehicle having the engine Eng and the motor/generator MG. However, the present invention is not limited to this. The starting control device for the vehicle of the present invention can be applied to an electric vehicle on which only the motor/generator MG is mounted as a traveling drive source, and to an engine vehicle on which only the engine Eng is mounted, and moreover, it can be applied to plug-in hybrid vehicles and fuel cell vehicles.

The invention claimed is:

1. A starting control device for a vehicle, comprising:
a first oil pump configured to perform hydraulic supply by being driven by a traveling drive source which becomes in a non-driven state during stopping of the vehicle while a brake pedal is depressed;
a second oil pump configured to perform the hydraulic supply by being driven by an electric motor which becomes in a non-driven state during the stopping of the vehicle while the brake pedal is depressed, the second oil pump being provided separately from the traveling drive source;
a starting clutch configured to transmit a drive force of the traveling drive source to drive wheels at a time of starting of the vehicle, the starting clutch being disposed between the traveling drive source and the drive wheels; and
a starting controller configured to increase oil pressure supplied to the starting clutch by a second oil pump discharge pressure by driving the second oil pump before the brake pedal is released, when an accelerator pedal is depressed while the brake pedal is still depressed during the stopping of the vehicle.

2. The starting control device for the vehicle according to claim 1, wherein the traveling drive source has an engine and a traveling motor, and
wherein when an accelerator opening degree at a time of depression of the accelerator pedal is at a predetermined threshold or less, the starting controller is configured to drive only the traveling motor when the brake pedal is released, and to cause the vehicle to start by the drive force, which is a drive force of the traveling motor.

3. The starting control device for the vehicle according to claim 1, wherein the traveling drive source has an engine and a traveling motor, and
wherein when an accelerator opening degree at a time of depression of the accelerator pedal exceeds a predetermined threshold, after setting the starting clutch to a disengaged state, the starting controller is configured to drive the first oil pump by driving the engine.

4. The starting control device for the vehicle according to claim 3, wherein after the accelerator opening degree exceeds the predetermined threshold, when the accelerator opening degree becomes below the predetermined threshold before the brake pedal is released, the starting controller is configured to maintain a driven state of the first oil pump by continuing driving of the engine.

5. A starting control method for a vehicle, wherein the vehicle includes:
a first oil pump configured to perform hydraulic supply by being driven by a traveling drive source which becomes in a non-driven state during stopping of the vehicle while a brake pedal is depressed;
a second oil pump configured to perform the hydraulic supply by being driven by an electric motor which becomes in a non-driven state during the stopping of the vehicle while the brake pedal is depressed, the second oil pump being provided separately from the traveling drive source; and
a starting clutch configured to transmit a drive force of the traveling drive source to drive wheels at a time of starting of the vehicle, the starting clutch being disposed between the traveling drive source and the drive wheels,
the starting control method comprising:
driving the second oil pump before the brake pedal is released, when an accelerator pedal is depressed while the brake pedal is still depressed during the stopping of the vehicle while the brake pedal is depressed; and
increasing oil pressure supplied to the starting clutch by a discharge pressure of the second oil pump.

* * * * *